United States Patent
Shegerian et al.

(10) Patent No.: US 9,365,227 B2
(45) Date of Patent: Jun. 14, 2016

(54) RECYCLING BIN

(71) Applicant: ELECTRONIC RECYCLERS INTERNATIONAL, INC., Fresno, CA (US)

(72) Inventors: John S. Shegerian, Fresno, CA (US); Tammy Shegerian, Fresno, CA (US); Kevin J. Dillon, Fresno, CA (US); Aaron Blum, Fresno, CA (US); John Reick, Fresno, CA (US)

(73) Assignee: ELECTRONIC RECYCLERS INTERNATIONAL, INC., Fresno, CA (US)

( * ) Notice: Subject to any disclaimer, the term of this patent is extended or adjusted under 35 U.S.C. 154(b) by 98 days.

(21) Appl. No.: 14/070,405

(22) Filed: Nov. 1, 2013

(65) Prior Publication Data

US 2015/0123364 A1    May 7, 2015

(51) Int. Cl.
*B62B 3/02* (2006.01)
*B62B 3/10* (2006.01)
*B62B 3/04* (2006.01)
*B62B 3/00* (2006.01)

(52) U.S. Cl.
CPC . *B62B 3/10* (2013.01); *B62B 3/004* (2013.01); *B62B 3/04* (2013.01); *B62B 3/005* (2013.01); *B62B 2203/28* (2013.01)

(58) Field of Classification Search
CPC ........ G06Q 10/30; B62B 3/002; B62B 3/004; B62B 3/005; B62B 2202/20; B62B 3/10; B62B 3/04; B62B 2203/28; B65F 1/006; B65F 1/0053; B65F 1/0073; B65F 1/1426; B65F 1/1468

USPC .......................... 280/79.2, 79.3, 47.34, 47.35
See application file for complete search history.

(56) References Cited

U.S. PATENT DOCUMENTS

| | | | | |
|---|---|---|---|---|
| 3,861,768 | A * | 1/1975 | Wilson | 312/249.8 |
| 4,509,805 | A * | 4/1985 | Welsch et al. | 312/210 |
| 5,044,644 | A * | 9/1991 | Duran et al. | 280/47.35 |
| 5,135,245 | A * | 8/1992 | Pagone et al. | 280/79.2 |
| 5,203,618 | A * | 4/1993 | Oshall | B65F 1/067 |
| | | | | 220/495.08 |
| D347,916 | S * | 6/1994 | Russ | D34/5 |
| 5,324,054 | A * | 6/1994 | Kleier | 280/79.2 |
| 5,531,464 | A * | 7/1996 | Maurer | B62B 3/00 |
| | | | | 211/126.15 |
| 5,718,168 | A * | 2/1998 | Harrington | 100/226 |
| 6,158,830 | A * | 12/2000 | Johnson et al. | 312/218 |
| 6,170,686 | B1 * | 1/2001 | Flores | 220/4.33 |
| 7,143,905 | B2 * | 12/2006 | Enayati et al. | 220/23.88 |
| 7,549,654 | B2 * | 6/2009 | Anderson et al. | 280/47.34 |
| 2004/0026296 | A1 * | 2/2004 | Nesting | 206/600 |
| 2006/0027983 | A1 * | 2/2006 | Pederson et al. | 280/47.35 |

(Continued)

*Primary Examiner* — John Walters
*Assistant Examiner* — Brian Swenson
(74) *Attorney, Agent, or Firm* — Pillsbury Winthrop Shaw Pittman LLP

(57) ABSTRACT

A recycle bin is described having multiple enclosures to separate small waste from large waste. The enclosures may be configured with variable sized subdivisions and shelved on a track to allow complete detachment of the enclosure. Door panels may be secured with securing mechanisms and handles may be provided to facilitate moving. The recycle bin may include casters with locking mechanisms to prevent movement of the recycling bin. The casters may be attached on the bottom portion of the recycling bin. One or more pockets may be disposed on the recycling bin. The one or more pockets may be configured to accommodate lifting of the recycling bin. The recycling bin may be configured for recycling e-waste.

10 Claims, 1 Drawing Sheet

(56) References Cited

U.S. PATENT DOCUMENTS

| | | | |
|---|---|---|---|
| 2007/0158345 A1* | 7/2007 | Booth et al. | 220/6 |
| 2011/0094899 A1* | 4/2011 | Johnson et al. | 206/204 |
| 2011/0255949 A1* | 10/2011 | Lemola | B65D 19/06 414/800 |
| 2013/0221630 A1* | 8/2013 | Tavolino | B62B 3/002 280/79.2 |
| 2014/0278630 A1* | 9/2014 | Gates et al. | 705/7.13 |
| 2014/0379588 A1* | 12/2014 | Gates et al. | 705/308 |
| 2015/0066677 A1* | 3/2015 | Bowles et al. | 705/26.3 |
| 2015/0076779 A1* | 3/2015 | Lindblom et al. | 280/47.35 |

\* cited by examiner

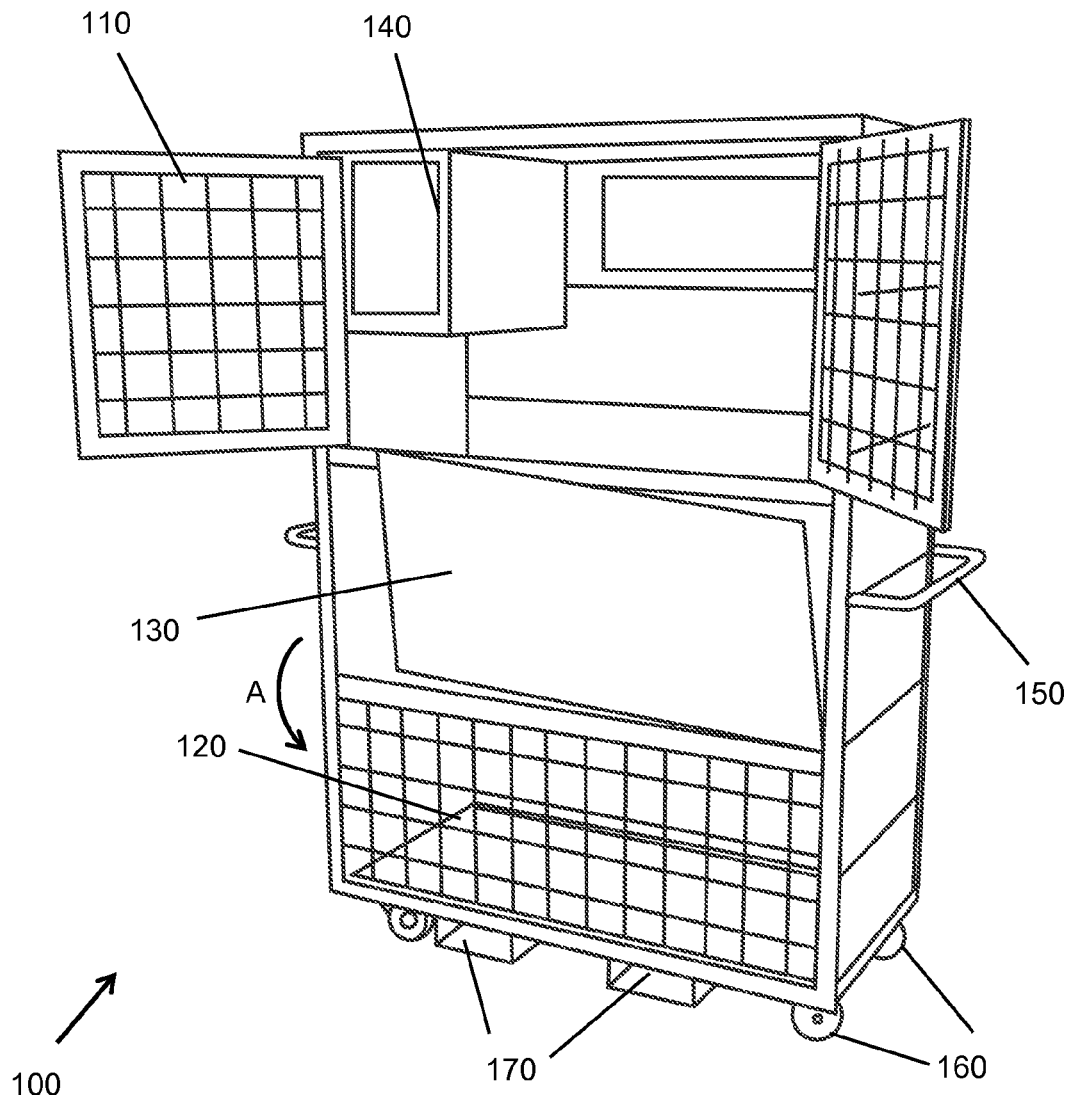

RECYCLING BIN

BACKGROUND

The present disclosure relates to containers, and more particularly containers employed in the recycling industry.

As cities become more populous waste recycling has increased in importance. Waste recycling of electronic materials or e-waste, in particular, is problematic because of the shrinking life span of electronic devices which creates increasingly larger amounts of this type of waste. Developing a local mature e-waste recycling program can reduce the risks associated with shipping e-waste to developing countries. Moreover, developing countries frequently dismantle e-waste via crude and often unsafe practices which may impact the global environment. Increasingly, municipalities are encouraging their citizens to recycle e-waste in a safe and socially responsible manner with a domestic e-waste recycler. One concern facing the recycling industry, however, is the cost of collecting and transporting discarded electronics. The variability in size and nature of electronic waste are also among the numerous challenges in handling e-waste.

SUMMARY

In some aspects, embodiments disclosed herein relate to a recycling bin comprising a top portion configured to be in an open or closed position, a bottom portion, an optional middle portion, the optional middle portion comprising solid walls about the outer surface, an enclosure portion comprising a shelf with a door panel within the recycling bin, the door panel being equipped with a securing mechanism, at least one handle adjoined the recycling bin to facilitate moving the recycling bin, casters with a locking mechanism to prevent movement of the recycling bin when the locking mechanism is engaged, the casters being attached on the bottom portion of the recycling bin, and one or more pockets disposed on the recycling bin, wherein the one or more pockets are configured to accommodate lifting of the recycling bin.

In some aspects, embodiments disclosed herein provide a recycling bin comprising a top portion configured to be in an open or closed position, a bottom portion, a middle portion, the middle portion comprising solid gate that can be lowered to facilitate placing articles towards the bottom of the recycling bin, an enclosure portion comprising a shelf with a door panel within the recycling bin, the door panel being equipped with a securing mechanism, at least one handle adjoined the recycling bin to facilitate moving the recycling bin, casters with a locking mechanism to prevent movement of the recycling bin when the locking mechanism is engaged, the casters being attached on the bottom portion of the recycling bin, and one or more pockets configured to accommodate lifting of the recycling bin, wherein the recycling bin is configured for recycling e-waste.

BRIEF DESCRIPTION OF DRAWINGS

Various embodiments of the present disclosure will be described herein below with reference to the figures wherein:

FIG. 1 shows a recycling bin in accordance with an exemplary embodiment.

DETAILED DESCRIPTION

The present embodiments will now be described more fully hereinafter with reference to the accompanying drawings, in which particular exemplary embodiments are shown. Unless otherwise defined, technical and scientific terms used herein have the same meaning as commonly understood by one of ordinary skill in the art. Although methods and materials similar or equivalent to those described herein can be used in the practice or testing of the present embodiments, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, embodiments may be provided in many different forms and should not be construed as limited to the illustrated embodiments set forth herein. Rather, these illustrated embodiments are provided solely for exemplary purposes so that this disclosure will be thorough and complete, and will fully convey the scope of various embodiments to those skilled in the art. Other features and advantages of the embodiments disclosed herein will be apparent from the following detailed description, and from the claims.

Embodiments disclosed herein relate to recycling bins with an eye toward improving the handling of e-waste in particular. Among the beneficial features of the e-recycling bins disclosed herein is the ability to sort e-waste by size. This is particularly useful because the breakdown of larger components may differ quite significantly from smaller materials. Embodiments of recycling bins disclosed herein also feature designs that may be compact for collection and efficient storage, including the ability to stack the units. Moreover, the bins are configured to be easily movable by man or machine. These and other advantages will be apparent to those skilled in the art.

In some embodiments, there are provided recycling bins comprising a top portion configured to be in an open or closed position, a bottom portion, an optional middle portion, the optional middle portion comprising solid walls about the outer surface, an enclosure portion comprising a shelf with a door panel within the recycling bin, the door panel being equipped with a securing mechanism, at least one handle to facilitate moving the recycling bin, casters with a locking mechanism to prevent movement of the recycling bin when the locking mechanism is engaged, and one or more pockets configured to accommodate lifting of the recycling bin.

Referring now to FIG. 1, there is shown a recycling bin 100 in accordance with one embodiment. Although shown in a generally rectangular configuration, recycling bin 100 may be of any geometry, including for example cylindrical. Recycling bin 100 comprises a top portion 110 configured to be in an open or closed position. Top portion 110 may comprise doors that open outward as shown in FIG. 1. Although top portion 110 is shown as two halves that open out to either side, top portion 110 may also comprise a single door. Furthermore, top portion 110 may comprise one or two doors that open vertically rather than horizontally as shown. Where recycling bin 100 is cylindrical one or two doors may open outwardly. Alternatively, the one or two doors may be configured to slidably move circumferentially into open and closed positions. In some embodiments, top portion 110 is configured to accommodate a locking mechanism on the one or more doors, such as a pad or combination lock. In some embodiments, the top portion 110 comprises a mesh portion allowing visual inspection of the contents of the bin. In some embodiments, only a door portion may comprise the mesh portion as shown. In other embodiments, any portion and all sections of top portion 110 can include a mesh. In some embodiments, top portion 110 can include a door on number of sides of recycle bin 110. In some embodiments, one set of doors may be configured for access by a residential user while the other doors provide access to recycling transportation personnel.

In some embodiments, recycle bin 100 comprises a bottom portion 120. In some embodiments, the bottom portion comprises a mesh portion. As described above with respect to top portion 110, bottom portion 120 may include a mesh portion along any and all sides of recycle bin 100. Various features that may be included in bottom portion 120 are described herein further below. In some embodiments, bottom portion 120 may integrate directly with top portion 110. In some embodiments, bottom portion 120 may include an opening mechanism akin to the doors of top portion 110. In some embodiments, a section of bottom portion 120 is a solid gate which may be configured to change position into a ramp to allow particularly heavy e-waste to be rolled up and into recycle bin 100. In some embodiments, bottom portion 120a of a first bin 100a may be configured to fit into top portion 110b of a second bin 100b. In some such embodiments, stacked bins 100a and 110b may be locked together, via any mechanism, for storage and transportation.

In some embodiments, recycle bin 100 may include an optional middle portion 130 intervening between top portion 110 and bottom portion 120. Middle portion 130 may comprise solid walls about the outer surface. In some embodiments, optional middle portion 130 comprises a solid gate that can be lowered (see curved arrow A in FIG. 1) to facilitate placing articles inside of bottom portion 120 of recycling bin 100. In some embodiments, the solid gate can be locked in place in the open or closed position for this purpose. For example, the solid gate can be locked into the open position until such a time that bottom portion 120 is filled. Once filled, the solid gate may be closed and locked into place while the remainder of recycle bin 100 is filled. The solid gate may be optionally equipped with a handle to facilitate repositioning from the open and closed positions.

Referring again to FIG. 1, recycle bin 100 includes an enclosure portion 140 comprising a shelf with a door panel within the recycling bin, the door panel being equipped with a securing mechanism. Enclosure portion 140 is provided in the recycle bin to separate out smaller e-waste, such as cell phones, from larger e-waste. Enclosure 140 can be equipped with a mesh screen as well to provide visual inspection of the compartment. Enclosure 140 may be further subdivided into portions to separate small electronics by type. In some embodiments, Enclosure 140 may be secured with a lock such as a key lock, a padlock, or a combination lock. Although enclosure 140 is shown in FIG. 1 in the upper left corner of recycle bin 100, it may appear anywhere within recycle bin 100. In some embodiments, multiple enclosures 140 may be provided, each of which may vary in its dimensions. Enclosure 140 may also comprise an access door at the rear of the recycle bin. In some such embodiments, the rear access door may also be a mesh screen allowing for visual inspection of the contents of enclosure 140. In some embodiments enclosure 140 may include a shelf on a track that can be pulled out into an extended shelf. In some embodiments, enclosure 140 may be completely detachable from recycling bin 100. In some embodiments, the rear wall of recycling bin 100 may be configured in a modular manner to accommodate any number of enclosures 140 which are removable, allowing separate transport of the smaller enclosure 140 from the rest of the recycle bin. Thus, the user need not wait for recycle bin 100 to be entirely full before processing contents of enclosure 140.

Recycle bin 100 includes at least one handle 150 to facilitate moving the recycling bin. In some embodiments, a handle can be configured to fold down so that multiple recycling bins can be stacked close together without hand 150 being in the way. In some such embodiments handle 150 can lock in either the open and/or closed positions. Although FIG. 1 indicates handle 150 located at optional middle portion 130, it may also be placed at top portion 110 or at bottom portion 120. When placed at bottom portion 120, handle 150 may be configured in a manner similar to a trailer hitch allowing linkage of multiple recycle bins 100 in a chain. Thus, one side of recycle bin 100 may be equipped with male handle 150m, while the opposing side may be equipped with a female handle 150f. This may allow a plurality of recycling bins 100 to be moved by machine such as an electric or gas powered cart.

Recycle bin 100 further comprises casters 160 with a locking mechanism to prevent movement of the recycling bin when the locking mechanism is engaged. Casters 160 may be optionally configured to be retractable into the floor of bottom portion 120 to facilitate stacking. Casters 160 may also be non-retractable. In some such embodiments, top portion 110 may include grooves into which the wheels of casters 160 may be fitted for stacking purposes. In some embodiments casters 160 may be fit onto the underside of bottom portion 120. They may be affixed by any mechanical means including welding, by screw, nail, or other conventional means.

Recycle bin 100 further comprises one or more pockets 170 configured to accommodate lifting of the recycling bin. As indicated in FIG. 1, one embodiment of one or more pockets may include a pair of pockets configured for use with a forklift and placed on the underside of bottom portion 120. In some embodiments, a single pocket may also accommodate the prongs of a forklift. In some embodiments, one or more pockets 170 may be oriented in the long (perpendicular as shown) or short direction (as shown) of recycle bin 100. In other embodiments, one or more pockets 170 may appear on one or more of the side walls of recycle bin 100.

In some embodiments, recycling bin 100 is configured for stacking as briefly described above. In some such embodiments, top portion 110 may be equipped with grooves into which the casters 160, one or more pockets 170, or both may be fitted. Either or both of these elements may be used to prevent sliding of stacked recycling bins 100 when stacked. In some embodiments, one or more pockets 170 may comprise a female portion 170f for engaging in lifting and/or to engage a male portion 170m configured to interlock with female portion 170f when stacked. In some embodiments, stacked boxes may be provided with a clamping or other securing mechanism to hold the recycle bins 100 in stable in the stacked position. Stacked recycle bins 100 may be secured for transportation or simply for more efficient use of storage space.

In some embodiments, recycling bin 100 may be made of steel construction optionally with a corrosion resistant coating. In some embodiments, at least one side of the recycling bin may comprise corrugated panels for increased strength. The inner portion of recycle bin 100 may comprise dividers, open shelves, and other features to separate e-waste by classification type. In some embodiments, recycle bin 100 may be equipped with a means for grounding as deemed necessary.

In some embodiments, there are provided recycling bins comprising a top portion configured to be in an open or closed position, a bottom portion, a middle portion, the middle portion comprising solid gate that can be lowered to facilitate placing articles towards the bottom of the recycling bin, an enclosure portion comprising a shelf with a door panel within the recycling bin, the door panel being equipped with a securing mechanism, at least one handle to facilitate moving the recycling bin, casters with a locking mechanism to prevent movement of the recycling bin when the locking mechanism is engaged, and one or more pockets configured to accommodate lifting of the recycling bin.

In some such embodiments, the top portion is configured to accommodate a locking mechanism. In some such embodiments, the top portion comprises a mesh portion. In some embodiments, the bottom portion comprises a mesh portion. In some such embodiments, at least one side of the recycling bin comprises corrugated panels. In some such embodiments, the solid gate can be locked in place in the open or closed position. In some such embodiments, the one or more pockets are located under the bottom portion. In some such embodiments, the one or more pockets are located on a side portion of the recycling bin. In some such embodiments, the recycling bin is configured for stacking.

Accordingly, in the drawings and specification there have been disclosed typical embodiments and although specific terms may have been employed, the terms are used in a descriptive sense only and not for purposes of limitation. Embodiments have been described in considerable detail with specific reference to these illustrated embodiments. It will be apparent, however, that various modifications and changes can be made within the spirit and scope of the invention as described in the foregoing specification and as defined in the appended claims.

What is claimed is:

1. A recycling bin comprising:
    a top portion configured to be in an open or closed position;
    a bottom portion;
    an optional middle portion, the optional middle portion comprising solid walls about an outer surface of the recycling bin;
    an enclosure portion
        allowing separation of small waste from large waste;
            wherein the enclosure portion comprises:
                an optionally extendable shelf; and
                a door panel within the recycling bin, the door panel being equipped with a securing mechanism;
    at least one handle adjoined the recycling bin to facilitate moving the recycling bin;
    casters with a locking mechanism to prevent movement of the recycling bin when the locking mechanism is engaged, the casters being attached on the bottom portion of the recycling bin; and
    one or more pockets disposed on the recycling bin, wherein the one or more pockets are configured to accommodate lifting of the recycling bin;
    wherein the recycling bin is configured for stacking.

2. The recycling bin of claim 1 comprising a steel construction with corrosion resistant coating.

3. The recycling bin of claim 1, wherein the top portion is configured to accommodate a locking mechanism.

4. The recycling bin of claim 1, wherein the top portion comprises a mesh portion.

5. The recycling bin of claim 1, wherein the bottom portion comprises a mesh portion.

6. The recycling bin of claim 1, wherein at least one side of the recycling bin comprises corrugated panels.

7. The recycling bin of claim 1, wherein the optional middle portion comprises a solid gate that can be lowered to facilitate placing articles towards the bottom of the recycling bin.

8. The recycling bin of claim 7, wherein the solid gate can be locked in place in the open or closed position.

9. The recycling bin of claim 1, wherein the one or more pockets are located under the bottom portion.

10. The recycling bin of claim 1, wherein the one or more pockets are located on a side portion of the recycling bin.

* * * * *